United States Patent [19]

Claggett

[11] 4,160,999

[45] Jul. 10, 1979

[54] MOUNTING ARRANGEMENT FOR A TELEVISION MONITORING CAMERA

[76] Inventor: Joseph H. Claggett, 1017 E. Fourth Ave., Mitchell, S. Dak. 57301

[21] Appl. No.: 893,580

[22] Filed: Apr. 5, 1978

[51] Int. Cl.$^2$ .................... H04N 7/18; G03B 17/56; G03B 29/00

[52] U.S. Cl. .................... 358/108; 352/242; 352/243; 354/81; 358/210; 358/229

[58] Field of Search .................... 358/108, 210, 229; 352/242, 243; 354/81, 288, 293

[56] References Cited

U.S. PATENT DOCUMENTS

| | | | |
|---|---|---|---|
| 2,464,067 | 3/1949 | Barker | 354/81 |
| 3,258,595 | 6/1966 | Galante | 358/108 |
| 3,535,442 | 10/1970 | Jennings | 358/108 |
| 3,720,147 | 3/1973 | Bemis | 354/81 |
| 3,732,368 | 5/1973 | Mahlab | 358/108 |
| 3,739,703 | 6/1973 | Behles | 354/81 |
| 3,916,097 | 10/1975 | Imai | 358/108 |
| 3,935,380 | 1/1976 | Coutta | 358/108 |
| 3,993,866 | 11/1976 | Pearl | 358/108 |
| 4,080,629 | 3/1978 | Hammond | 358/229 |

*Primary Examiner*—Howard W. Britton
*Attorney, Agent, or Firm*—Bacon & Thomas

[57] ABSTRACT

A panel of a size to be inserted into a section of the hung framework of a suspended ceiling carries a housing, the lower portion of the housing projecting beneath the panel and comprising a tinted, partially transparent cylindrical sidewall closed at its lower end by a hinged, opaque cover. A rotatable bracket is mounted within the housing, and carries an opaque cylinder positioned within the partially transparent cylindrical sidewall, the cylinder having a window therein. A television monitoring camera is also mounted on the bracket, with its lens pointing through the window. A motor for operating the monitoring camera is mounted atop the housing, and the partially transparent cylindrical sidewall and the opaque cylinder cooperate to effectively shield the monitoring camera from view as it is panned over the premises.

10 Claims, 8 Drawing Figures

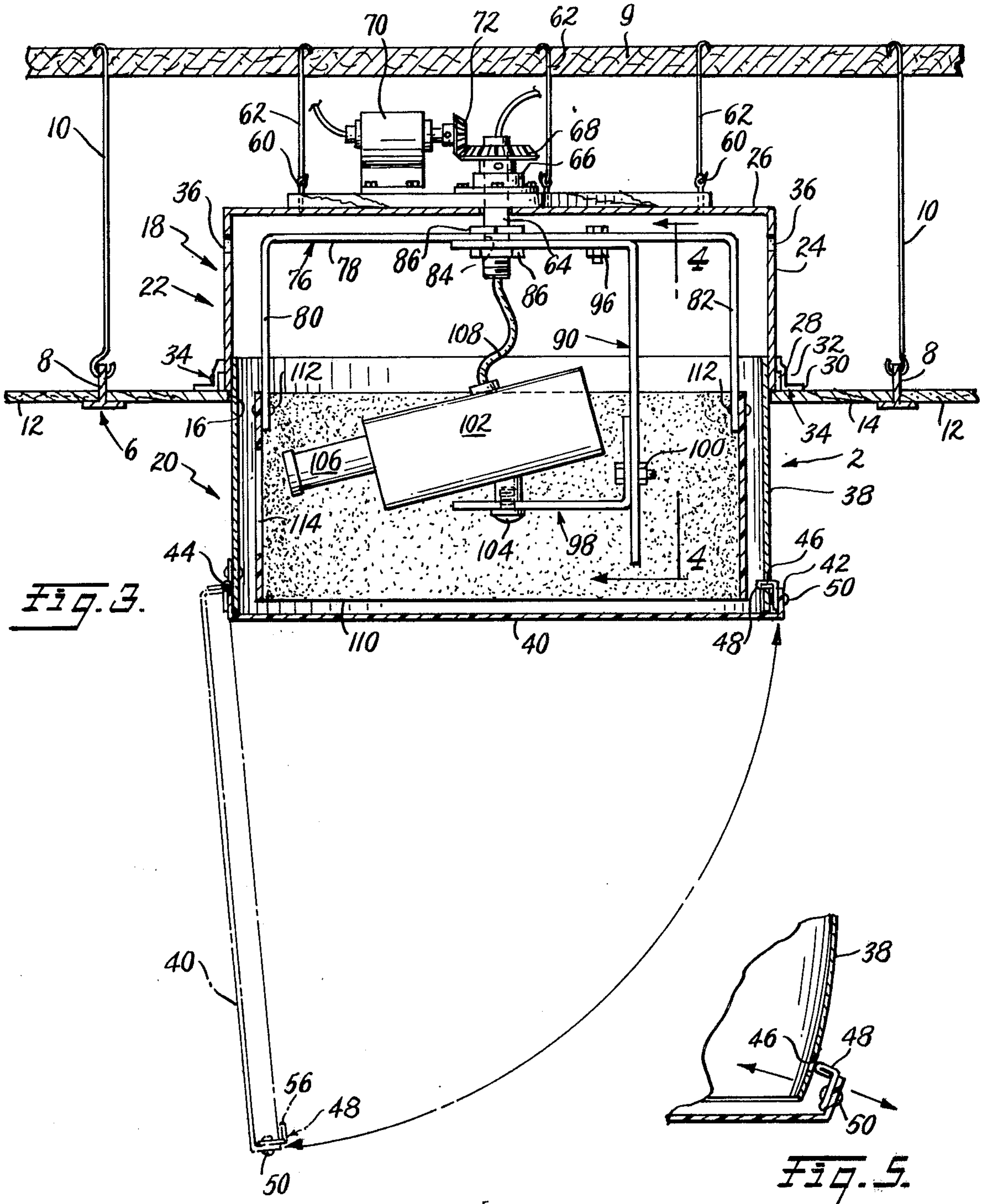
Fig. 3.
Fig. 5.
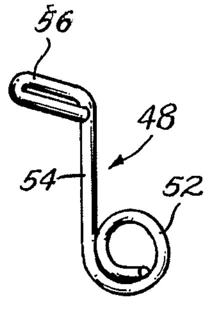
Fig. 6.

MOUNTING ARRANGEMENT FOR A TELEVISION MONITORING CAMERA

BACKGROUND OF THE INVENTION

1. Field of the Invention

The present invention relates generally to monitoring cameras, of the kind commonly installed in banks, retail establishments and the like to observe persons on the premises. More particularly, it relates to an improved arrangement for mounting such a monitoring camera as a part of a suspended ceiling, so that an observer normally cannot detect the camera's presence.

2. Description of the Prior Art

The use of television monitoring cameras to maintain surveillance over the premises of a bank, retail establishment and the like has become common in recent years, and different arrangements have been proposed for mounting such cameras. Essentially, such arrangements are of two types, both designed to deter crime and vandalism.

In the first type of monitoring camera arrangement, the camera is mounted in plain view, so that it can be readily seen and observed. Part of the conceptual theory of this kind of camera arrangement is that the mere, visually observable presence of the camera will itself be a deterent to crime and vandalism, and indeed in some instances the cameras are not even connected to function, or dummy cameras are used.

In the second type of monitoring camera arrangement, the one to which this invention relates, the camera is at least partially hidden or concealed from view. The intent here is to in fact closely observe persons on the premises, without their being fully aware that such observation is occurring, and without their feeling spied upon.

There have been several arrangements proposed for mounting an at least partially concealed or hidden monitoring camera, some quite ingenious. Among the arrangements that have been proposed for mounting a hidden camera are those shown in U.S. Pat. Nos. 3,535,442, 3,732,368 and 3,258,595. In the first two of these patents, the fixture carrying the camera can be seen to rotate or oscillate, which will often tip off persons within view that surveillance may be occurring. The last patent shows a concealed camera, but the arrangement is such as to not be adaptable to most situations where it is desired to use a concealed television monitoring camera.

There is need for an improved arrangement whereby a monitoring camera can be readily and economically mounted, particularly in a suspended ceiling as a part thereof, so that the camera is not normally observable by a passerby. The present invention is intended to satisfy that need.

SUMMARY OF THE INVENTION

It has been found that for good surveillance of a typical retail establishment or the like from a given television monitoring camera, such should be mounted on or near the ceiling, in a central location. In the preferred embodiment of the present invention, the monitoring camera mounting arrangement is designed so that it can be installed as a part of a suspended ceiling. In any given establishment, many cameras are often employed.

The use of suspended ceilings has become commonplace in commercial establishments and the like, such ceilings including a rectangular framework of inverted, T-shaped strip members that are hung below a structural ceiling on wires or hangers, the strip members defining rectangular openings twice as long as they are wide into which ceiling panels are placed. The region above the hung framework and the panels is utilized for air ducts and the like, which can be easily reached for repairs simply by removing one or more of the ceiling panels.

In the preferred embodiment a square mounting panel is utilized, the normal rectangular framework opening being divided into two squares by installing a T-shaped strip thereacross. The mounting panel is installed like a regular ceiling panel, and carries a housing within which the monitoring camera is mounted. The housing includes a lower portion that extends below the mounting panel, and an upper portion that projects thereabove. The lower housing portion comprises a tinted, partially transparent cylindrical sidewall, and an opaque cover that is hinged to the lower end of the sidewall, and which is movable between open and closed positions.

A bracket is mounted for rotation within the housing from its upper end, and carries an opaque cylinder on its lower end that is received within the partially transparent cylindrical sidewall, the cylinder having a single opening or window therein. The bracket is arranged to also carry a television monitoring camera, which is mounted with its lens pointing through the window in the opaque cylinder. A motor and gear arrangement is mounted on the top of the housing, and is arranged to be operable for oscillating or rotating the bracket, whereby the monitoring camera is panned back and forth.

The camera shoots through the window in the opaque cylinder and through the partially transparent cylindrical sidewall of the lower housing portion, the latter being sufficiently transparent to allow the camera to function, but tinted so as to make it difficult to observe what is therewithin. The opaque cylinder is preferably colored black on its exterior, to further make it difficult to observe what is within the housing, and serves to effectively conceal the monitoring camera. At most, all that will be visible will be the slowly rotating or oscillating window in the opaque cylinder, and it has been found that the tinting of the housing lower cylindrical sidewall makes observation of even this window very difficult.

As has been noted, the mounting panel is simply inserted into the hung framework. However, because of the weight thereof, and for safety reasons, it is also desirable to connect the upper end of the housing to the structural ceiling by wires or hangers, in the usual manner. The bracket is carried on a hollow shaft that projects through the upper end of the housing, and the cables for operating the camera are passed through this shaft.

In a second embodiment of the invention, the housing is converted for mounting directly to a structural ceiling, rather than being mounted as part of a suspended ceiling. In this embodiment a frusto-conical shade is secured to the upper portion of the housing and extends downwardly over two-thirds of the lower housing portion to improve the appearance of the apparatus, and to shield and shade the partially transparent cylindrical sidewall of the lower housing portion.

It is the principal object of the present invention to provide an arrangement for mounting a television monitoring camera on the ceiling of a room so that the presence of the camera is effectively concealed even while such is panning back and forth across the room.

Another object is to provide an arrangement for mounting a television monitoring camera that is economical to construct and pleasing in appearance.

A further object is to provide an arrangement especially designed for mounting a television monitoring camera as a part of a conventional suspended ceiling.

Other objects and many of the attendant advantages of the invention will become readily apparent from the following Description of the Preferred Embodiments, when taken in conjunction with the accompanying drawings.

BRIEF DESCRIPTION OF THE DRAWINGS

FIG. 3 is an enlarged, vertical sectional view through the television monitoring camera assembly of FIGS. 1 and 2, showing details of the construction thereof.

FIG. 5 is an enlarged, fragmentary view showing how the fastener and the sidewall of the lower portion of the housing cooperate to secure the hinged cover in a closed position;

FIG. 6 is an enlarged, perspective view of one of the securing clips for the cover;

DESCRIPTION OF THE PREFERRED EMBODIMENTS

Figure 1:
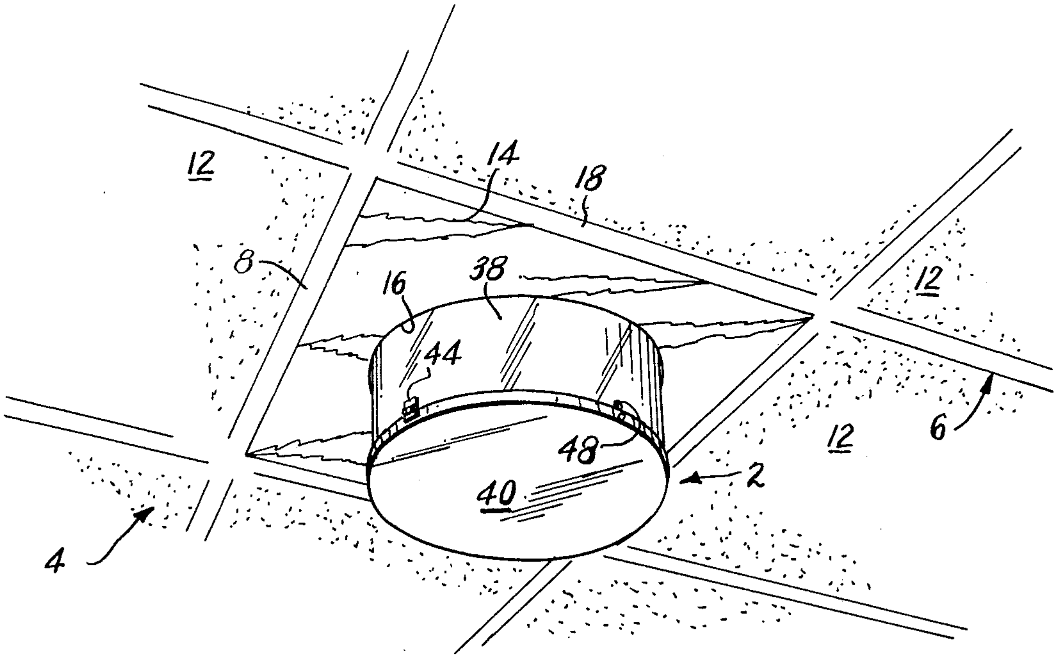
FIG. 1 is a perspective view looking up at a suspended ceiling, and showing the preferred embodiment of the monitoring camera assembly of the invention inserted into one of the sections of the ceiling.
Figure 2:
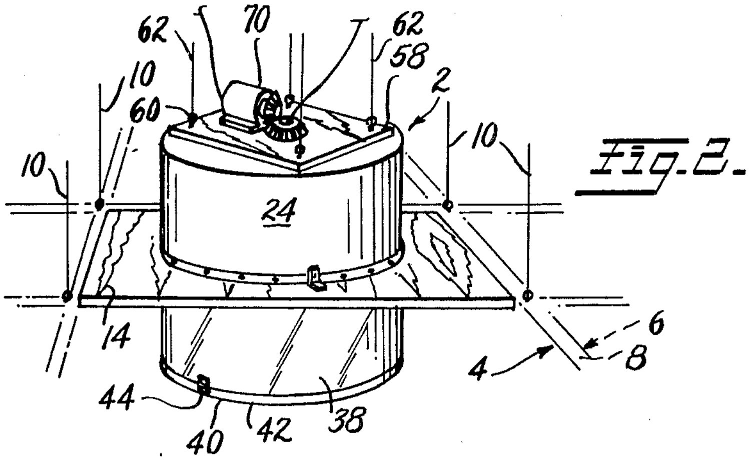
FIG. 2 is a perspective view, looking downward on the assembly of FIG. 1, with the elements of the suspended ceiling shown in broken lines for purposes of clarity.

Referring now to FIGS. 1-6 and 8 of the drawings, the television monitoring camera assembly of the preferred embodiment of the invention is indicated generally at 2, mounted as part of a conventional suspended ceiling 4. The suspended ceiling includes a framework 6 comprised of a plurality of inverted T-shaped strips 8 arranged to form a rectangular grid, and which are hung from a structural ceiling 9 by wires or hangers 10. Ceiling panels 12 are normally mounted in each of the sections of the framework 6, and such are merely held in place by gravity and the surrounding strips 8. The region above the framework 6 will typically be utilized to locate air ducts, and the like.

The assembly 2 of the invention includes a square or rectangular mounting panel 14, having dimensions such that it will fit into one of the sections of the suspended ceiling framework 6 in place of one of the ceiling panels 12, with its edges resting on the strips 8. As shown in FIG. 3, the mounting panel 14 has a central opening 16 therein, within which is mounted a housing 18 including a lower portion 20 that extends below the mounting panel, and an upper portion 22. The upper housing portion 22 will typically be made of metal or plastic, and includes a cylindrical sidewall 24 and an upper end wall 26. A rim 28 extends around the lower end of the sidewall 24, and L-shaped clips 30 are positioned around the periphery of the rim 28 and are secured to the sidewall 24 and the mounting panel 14 by screws 32 and 34, respectively. The upper end of the sidewall 24 is preferably provided with circumferentially spaced ventilation holes 36.

The lower housing portion 20 includes a cylindrical sidewall 38, the upper end of which is received within the lower end of the upper sidewall 24 and secured by the screws, bolts or rivets 32, or additional fasteners, if so desired. The lower sidewall 38 is made from a partially transparent, tinted plastic, chosen so that a television camera can shoot therethrough, but so that the partial transparency caused by the tinting will serve to partially shield anything within the housing from view. Typically, a light gray or tan tinting is preferred.

The lower housing portion 20 is closed by an opaque cover 40 made of plastic or metal, and which carries an upstanding rim 42 that is telescopically receivable on the lower end of the cylindrical sidewall 38. A hinge 44 connects the rim 42 to the sidewall 38, and opposite to the hinge 44, the cylindrical sidewall 38 is provided with spaced latch openings 46. Securing clips 48 are secured to the rim 42 by bolts or rivets 50, and are engageable in the latch openings 46 to secure the cover 40 in a closed position.

One of the securing clips 48 is shown enlarged in FIG. 6. The clips 48 are each made from a piece of spring wire, and each includes a base loop portion 52 for receiving the bolt 50, a resilient arm 54, and a nose 56 that is formed as a double-bent portion with a rounded tip. As shown in FIG. 5, the nose 56 partially deflects along with the rim 42 to connect or disconnect each securing clip with its latch opening 46, with the cylindrical sidewall 38 being made resilient so that it can be deflected resiliently inwardly to accommodate entry of the nose 56 into the latch opening. The securing clip and latch opening arrangement is economical, secure when latched, and makes it possible for maintenance personnel to easily open the cover 40 to inspect the apparatus within the housing 18.

The upper end wall 26 of the housing 18 carries a mounting plate 58 that is secured thereto by screws or the like, and which carries eye screws 60 that receive the lower end of hangers 62. The hangers 62 are suspended from the structural ceiling 9, and serve to carry the weight of the assembly 2. While the hangers 62 may not be truly needed, since the weight of the assembly 2 is carried by the framework 6 also, such serve as added security, especially for safety reasons.

A hollow, vertical shaft 64 is mounted centrally of the upper end wall 26, to extend through the end wall and the mounting plate 58. The mounting plate 58 carries a mounting flange 66, and the upper end of the shaft 64 carries a bevel gear 68 that rides on the mounting flange 66. An electric motor 70 is mounted on the mounting plate 58 and carries a gear 72 that engages the bevel gear 68, the motor 70 being designed and arranged to rotate or oscillate the shaft 64 back and forth repeatedly over a range of approximately 360°. The precise motor and gearing arrangement utilized is of course a matter of choice and design, so long as the desired back and forth rotation of the shaft 64 is obtained.

Figure 7:
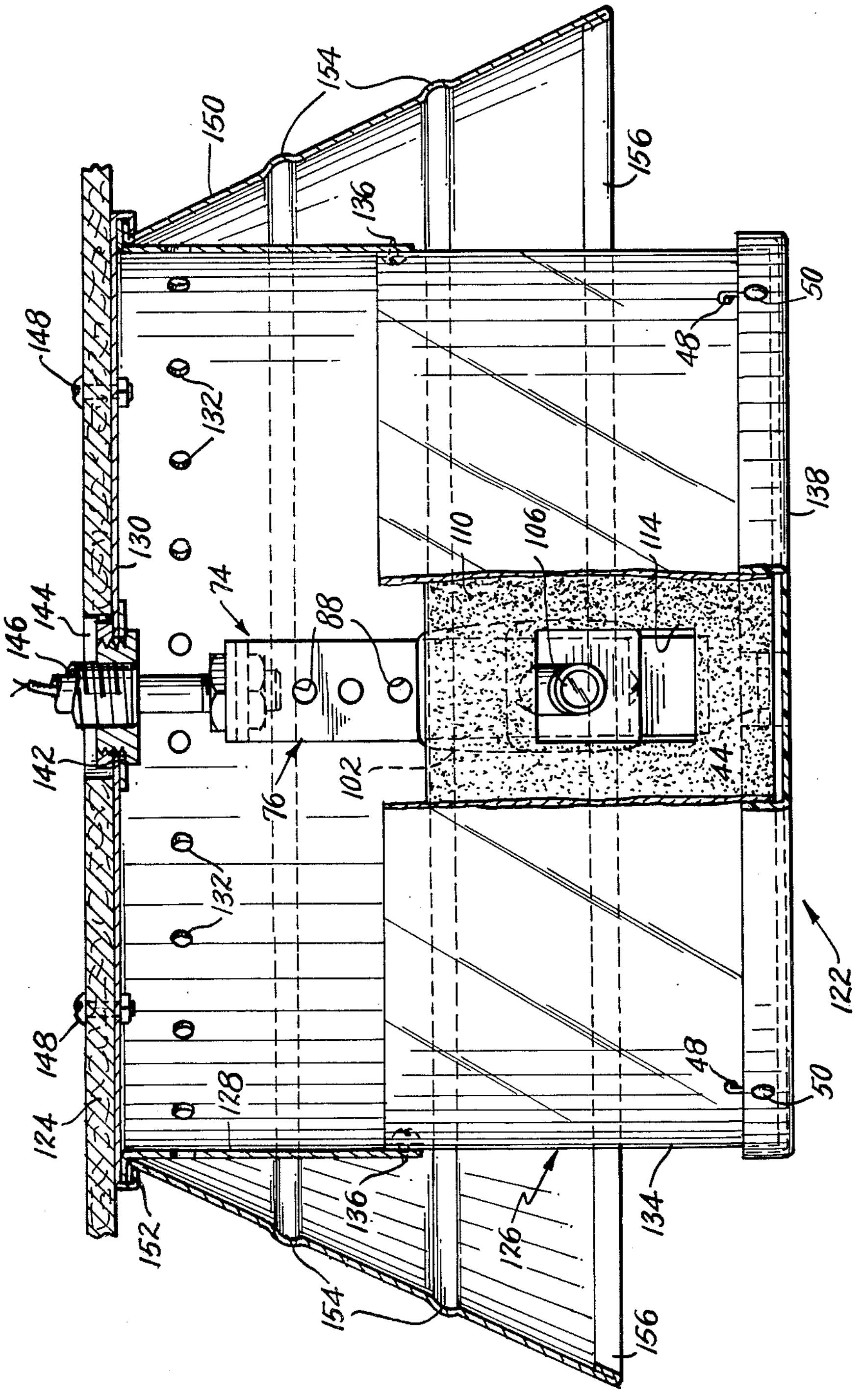
FIG. 7 is a vertical, sectional view showing a second embodiment of the invention for mounting directly on a structural ceiling, wherein the mounting panel is eliminated, and a frusto-conical shade is secured to the upper portion of the housing.

Mounted on the lower end of the vertical shaft 64 is a bracket 74, including an inverted U-shaped member 76 having a base 78 and two depending legs 80 and 82. The base 78 has a central opening 84 therein for receiving the lower end of the shaft 64, and the bracket 74 is secured to the shaft by nuts 86 or other suitable means. As shown in FIG. 7, the member 76 is provided with spaced mounting openings 88 throughout its extent.

The bracket 74 further includes an L-shaped support arm 90, provided with spaced mounting openings 92 throughout its extent, and with an opening 94 near the end of the horizontal leg thereof of a size to receive the drive shaft 64. The arm is thus connected to the U-shaped member 76 by the nuts 86, and by a separate bolt 96. Finally, the bracket 74 is completed by an L-shaped mounting arm 98, one leg of which is secured to the vertical leg of the support arm 90 by a bolt 100. A television monitoring camera 102, of any suitable design, is secured to the horizontal leg of the mounting arm 98 in the usual manner by a mounting screw 104, the camera 102 including a lens 106. A cable 108 extends from the camera 102, through the hollow drive shaft 64, and to a remote monitoring location. The openings 88 and 92 in the U-shaped member 76 and the support arm 90 make it possible to accommodate nearly any camera on the bracket 74.

Also carried by the U-shaped member 76 is an opaque cylinder 110, having a diameter less than the inner diameter of the cylindrical sidewall 38 within which it is received. The opaque cylinder 110, which can be made of plastic, is secured to the lower ends of the legs 80 and 82 of the bracket 74 by screws, bolts or rivets 112, and has a single cut-out or window 114 therein through which the lens 106 of the camera 102 is aimed. The height of the cylinder 110 is about the same as the height of the lower cylindrical sidewall 38 between the mounting panel 14 and the rim 42 of the cover 40, so that it lies behind substantially the full visible portion of the partially transparent cylindrical sidewall. The exterior surface of the opaque cylinder 110 is painted a dark color, preferably black, thus making it less visible to an observer.

The opaque cylinder 110 and the camera 102 are thus both carried by the same bracket 74, and are oscillated back and forth by the drive shaft 64. The opaque cylinder 110 serves to effectively conceal the camera 102 during panning movements, the only possible observable feature being the window 114. Because the lower cylindrical sidewall 38 is tinted and only partially transparent, however, even the window 114 will normally go unnoticed. Thus, the assembly as just described is effective to meet the goals set forth hereinabove for the invention.

Figure 8:
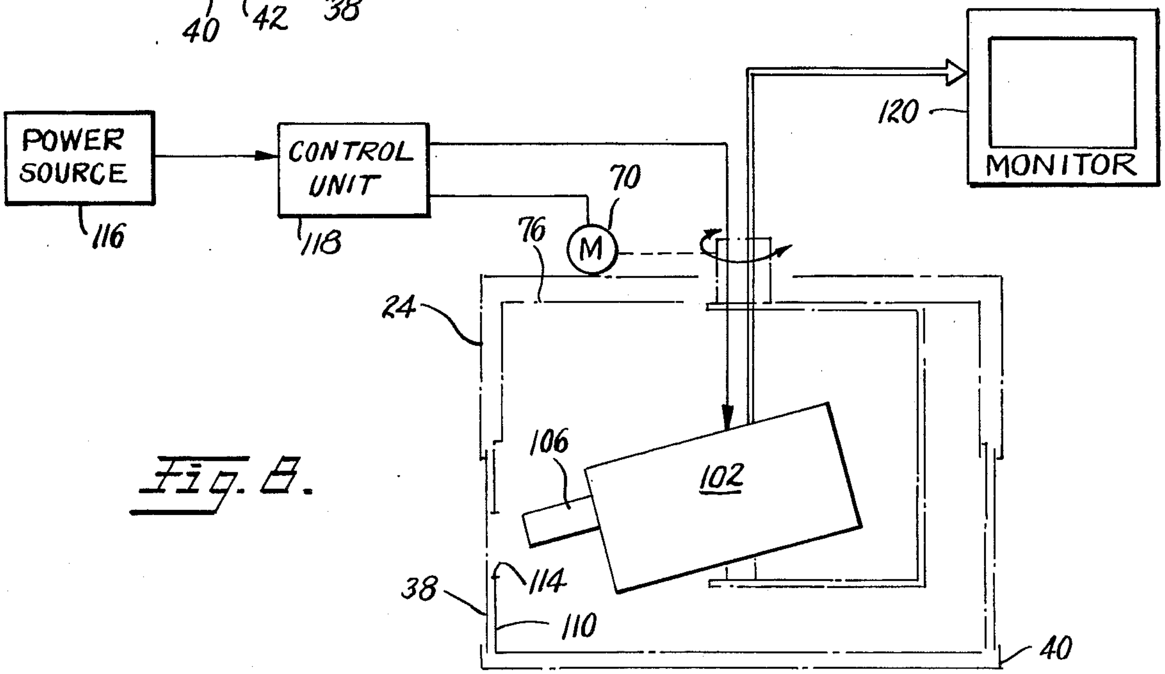
FIG. 8 is a circuit diagram, showing the monitoring system of the invention in schematic form.
Figure 4:
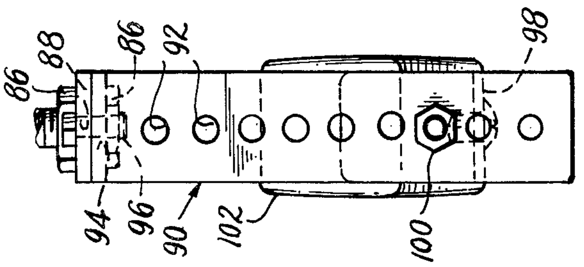
FIG. 4 is an enlarged elevational view, partially in section, taken on the line 4—4 in FIG. 3, and showing the bracket for mounting the opaque cylinder and the camera.

Referring now to FIG. 8, the monitoring system of the invention is shown in schematic form. The system is provided with electrical energy from a power source 116, through a master control unit 118. The panning motor 70 and the camera 102 are supplied with energy from the control unit 118, and the camera 102 is connected with a monitor television set 120 located in a suitable viewing location. The leads to and from the camera 102 are all included within the cable 108, as will be readily understood.

Referring now to FIG. 7, a modification of the invention is shown generally at 122, adaptable to be secured directly to a structural ceiling 124, or the like. The assembly 122 includes a housing 126 similar in construction to the housing 18, and comprising an upper, opaque cylindrical sidewall portion 128 terminating in an upper end wall 130, and provided with ventilation holes 132. The upper end of a partially transparent, tinted lower cylindrical sidewall 134 is received in the lower end of the upper sidewall 128, and is secured by screws 136. A cover 138 provided with an upstanding flange 140 is hinged to the lower sidewall 134, and is secured in closed position by spaced securing clips 48.

The upper end wall 130 has a central opening 142 fitted with a bushing 144, within which a hollow drive shaft 146 is mounted, corresponding to the drive shaft 64. The drive shaft 146 carries a bracket 74, which in turn mounts an opaque cylinder 110, and a television camera 102, the cylinder 110 having the window 114 therein. In this embodiment, the upper end wall 130 is simply secured to the structural ceiling 122 by suitable fasteners 148, and the drive motor for the assembly is mounted at a location (not shown) above the ceiling 122, and connected with the drive shaft 146.

In order to make the housing 126 more attractive, and to shield and shade the partially transparent, tinted lower cylindrical sidewall 134, the assembly 122 is provided with a frusto-conical shade 150, extending vertically for the full height of the upper sidewall 128 and for about the upper two-thirds of the lower sidewall 134. The upper end of the shade 150 snugly engages with the upper sidewall 134, and preferably is connected thereto by interlocked flanges 152. The shade 150 can be provided with decorative ribs 154, and the lower edge 156 thereof is turned inwardly. The result of providing the shade 150 is to make the assembly 122 appear to be a light fixture or the like, and to obscure the distinction between the opaque upper sidewall 128 and the lower, partially transparent cylindrical sidewall 134. In addition, bright light is prevented by the shade 150 from playing directly on the lower cylindrical sidewall 134, thereby helping to assure that the tinting thereof will conceal the opaque cylinder 110 and its window 114.

Obviously, many modifications and variations of the invention are possible. For example, the camera 102 could be mounted with a tilt mechanism, so that it could move vertically during a horizontal panning sweep. The materials used to construct the housing and the other elements can be varied, and it is contemplated, for example, that the upper housing portion 22 might be made of plastic and molded integrally with the mounting panel 14, thereby eliminating the need for the clips 30 and improving the overall appearance of the assembly. These and similar changes are all considered to be within the present invention.

I claim:

1. An arrangement for mounting a monitoring camera on a ceiling, including:

- a housing including upper and lower portions, said lower housing portion including a partially transparent, cylindrical sidewall;
- means for mounting said housing on said ceiling, with at least said lower housing portion extending downwardly from said ceiling;
- a rotatable drive shaft mounted to extend into said housing from the upper end thereof;
- motor means connected with said drive shaft for effecting rotational movement thereof;
- bracket means mounted on the lower end of said drive shaft, within said housing;
- an opaque cylinder carried by said bracket means and received within said partially transparent cylindrical sidewall of said lower housing portion, said opaque cylinder having a window therein; and said bracket means being adaptable to mount a monitoring camera within said opaque cylinder, with its lens aimed through said window, said bracket means, said opaque cylinder and said camera being movable as a unit upon rotation of said drive shaft by said motor means, and said partially transparent lower cylindrical sidewall and said opaque cylinder concealing said camera from view.

2. An arrangement for mounting a monitoring camera as recited in claim 1, wherein said ceiling is a suspended ceiling including a hung framework made up of interconnected strips arranged in a rectangular pattern, and wherein said means for mounting said housing on said ceiling includes:

a mounting panel receivable in one of the sections of said hung framework, said housing being carried by said mounting panel, with at least said partially transparent, cylindrical sidewall of said lower housing portion projecting downwardly from said mounting panel.

3. An arrangement for mounting a monitoring camera as recited in claim 2, wherein the upper portion of said housing extends above said mounting panel, and wherein said motor means is mounted on the upper end of said housing.

4. An arrangement for mounting a monitoring camera as recited in claim 3, including additionally:

a mounting plate secured to the top of said housing; and hanger means for connecting said mounting plate to ceiling structure positioned thereabove;

said motor means being carried by said mounting plate.

5. An arrangement for mounting a monitoring camera as recited in claim 1, wherein said ceiling is a structural ceiling, and wherein said means for mounting said housing includes fastener means for securing the upper end of said housing to the undersurface of said structural ceiling, said arrangement further including:

a frusto-conical shade secured to the exterior of said housing at the upper end thereof, the vertical height of said shade being greater than the vertical height of the upper portion of said housing, whereby said shade is effective to shade and shield partially transparent, cylindrical sidewall of said lower housing portion.

6. An arrangement for mounting a monitoring camera as recited in claim 1, wherein the lower end of said housing is closed by a hinged cover, and including means for securing said hinged cover in a closed position.

7. An arrangement for mounting a monitoring camera as recited in claim 6, wherein said means for securing said hinged cover in a closed position includes:

at least one securing clip carried by said hinged cover at a point spaced from the hinge connecting it to said housing, said securing clip including a nose, and the lower edge of said cylindrical sidewall of said lower housing portion having a latch opening therein adapted to receive said securing clip nose when said cover is in a closed position, said cylindrical sidewall being resiliently bendable to allow for insertion and removal of said securing clip nose.

8. An arrangement for mounting a monitoring camera as recited in claim 1, wherein said partially transparent, cylindrical sidewall of said lower housing portion is tinted.

9. An arrangement for mounting a monitoring camera as recited in claim 1, wherein the exterior of said opaque cylinder is dark colored.

10. An arrangement for mounting a monitoring camera as recited in claim 1, wherein said bracket means includes:

an inverted U-shaped member, connected centrally of the base portion thereof to the lower end of said drive shaft, said opaque cylinder being connected to the depending legs of said U-shaped member;

an L-shaped support arm, one leg of said support arm being connected to said base portion of said U-shaped member, and the other leg thereof extending vertically downwardly; and an L-shaped mounting arm, one leg of said mounting arm being secured to the downwardly extending leg of said support arm, and the other leg of said mounting arm extending horizontally and being adapted to support said monitoring camera, said U-shaped member and said L-shaped support arm having spaced openings therein, whereby different monitoring cameras can be readily accommodated.

* * * * *